(12) United States Patent
Morley et al.

(10) Patent No.: US 8,554,046 B2
(45) Date of Patent: Oct. 8, 2013

(54) PROVIDING INTERACTIVE CONTENT DURING TRICK MODE

(75) Inventors: D. Beau Morley, Somerville, MA (US); Andrew J Afram, Somerville, MA (US); Hannah Y Moon, Boston, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1082 days.

(21) Appl. No.: 12/144,256

(22) Filed: Jun. 23, 2008

(65) Prior Publication Data

US 2009/0317053 A1   Dec. 24, 2009

(51) Int. Cl.
*H04N 5/932* (2006.01)

(52) U.S. Cl.
USPC .............. 386/201; 386/46; 386/95; 725/34; 725/40; 725/47; 725/52; 725/87; 725/110; 725/136

(58) Field of Classification Search
USPC .................. 386/46, 68, 95; 725/40, 34, 52, 725/87, 110, 47, 136
See application file for complete search history.

(56) References Cited

U.S. PATENT DOCUMENTS

| | | | |
|---|---|---|---|
| 2002/0144262 A1* | 10/2002 | Plotnick et al. | 725/32 |
| 2004/0005143 A1* | 1/2004 | Tsuru et al. | 386/95 |
| 2004/0034874 A1* | 2/2004 | Hord et al. | 725/136 |
| 2004/0103429 A1* | 5/2004 | Carlucci et al. | 725/32 |
| 2005/0076359 A1 | 4/2005 | Pierson et al. | |
| 2006/0117357 A1 | 6/2006 | Surline | |
| 2007/0078732 A1* | 4/2007 | Crolley et al. | 705/27 |
| 2007/0107010 A1* | 5/2007 | Jolna et al. | 725/34 |
| 2007/0169157 A1 | 7/2007 | Abernethy et al. | |
| 2008/0040740 A1 | 2/2008 | Plotnick et al. | |
| 2008/0092158 A1 | 4/2008 | Bhatnagar et al. | |

FOREIGN PATENT DOCUMENTS

| | | |
|---|---|---|
| CN | 1472958 | 2/2004 |
| CN | 1833442 | 9/2006 |
| CN | 1939054 | 3/2007 |
| CN | 101077002 | 11/2007 |
| WO | 2005/034503 | 4/2005 |
| WO | 2007/110561 | 10/2007 |

OTHER PUBLICATIONS

"TiVo's Fast Forward Ads Are Back—My Surmise", http://surmise.blogspot.com/2007/01/tivos-fast-forward-ads-are-back_15.html, 3 pages, Jan. 15, 2007.
"OpenCable™—Enhanced Television (ETV)", http://www.opencable.com/etv/, 1 page, printed on May 29, 2008.
Ellis, "The OCAP Primer: The Gateway to Interactive Content", http://www.ctam.com/ocap/etvandocap.htm, 2 pages, printed on May 9, 2008.
"Enhanced TV Application Messaging Specification" Cable Labs, Jul. 27, 2005, pp. 1-26.
"Enhanced TV Binary Interchange Format 1.0" Cable Labs, Sep. 21, 2007, pp. 1-420.

* cited by examiner

*Primary Examiner* — Jeffrey Pwu
*Assistant Examiner* — Hee Song

(57) ABSTRACT

A system may receive an enhanced media stream that includes media content and interactive content relating to the media content, present the media content for display on a video display device, detect initiation of a trick mode during presentation of the media content, and present information, relating to the interactive content, superimposed on the media content presented for display on the video display device during the trick mode.

20 Claims, 13 Drawing Sheets

PROVIDING INTERACTIVE CONTENT DURING TRICK MODE

BACKGROUND

Since the advent of the digital video recorder (DVR), fast-forwarding through recorded advertisements has been a concern that has been voiced by advertisers. With DVR penetration in American households growing every day, more and more users are watching television from their DVR and some of them are fast-forwarding through the commercials. As a result, advertisers are looking for innovative solutions to solve this potential loss of viewers.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Consumers do not appear to be averse to advertising over which they have control (e.g., where the consumers can opt in or select the advertising they want in some format). The problem with current television advertising is that consumers have no control (i.e., consumers just see what is broadcast to them).

Recording devices, such as DVRs, provide the opportunity for consumers to take their television viewing to the other extreme—which is to avoid the advertising altogether—by fast forwarding through the advertising. But this is not control over the advertising as much as it is avoidance of the advertising.

Implementations described herein may present consumers with interactive content regarding television content (e.g., commercials and/or television programs) when the consumers are viewing the television content in a trick mode. A "trick mode," as used herein, may refer to a mode other than a normal play mode. For example, the trick mode may refer to a rewind mode, a fast forward mode, or a pause mode. The trick mode is inherently interactive because consumers may press a button (e.g., on their remote control) to start or end the trick mode process.

Figure 1:
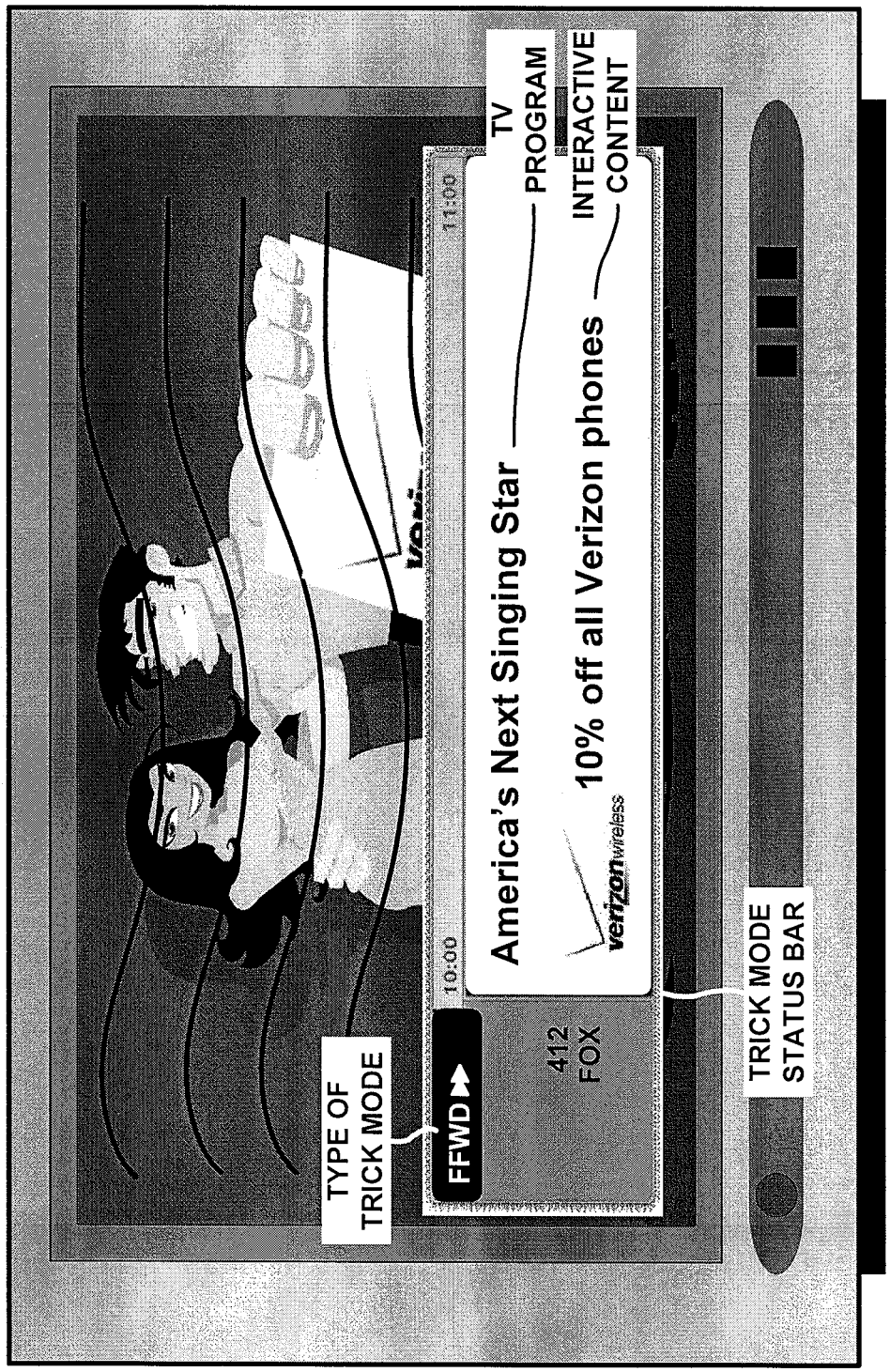
FIG. 1 is a diagram that illustrates an overview of an implementation described herein.

FIG. 1 is a diagram that illustrates an overview of an implementation described herein. Assume that a user is watching a recorded television program entitled "America's Next Singing Star," and during a commercial break, a Verizon wireless commercial is presented. The user presses a fast forward button on his/her remote control to activate the trick mode. As shown in FIG. 1, a trick mode status bar may be presented during the trick mode. The trick mode status bar may include certain types of information. For example, the trick mode status bar may include information identifying the type of trick mode that is occurring (e.g., fast forwarding, rewinding, or pausing). The trick mode status bar may also include information regarding the television program that the user is watching, such as the name of the television program, a description of the television program, and/or the channel on which the television program was, or is being, broadcast.

As shown in FIG. 1, according to an implementation described herein, the trick mode status bar may also include information regarding interactive content associated with the commercial that is being presented. In FIG. 1, the information indicates to the user that the user can obtain 10% off all Verizon phones.

By adding information relating to the content through which the user fast forwards or rewinds, the user's interactive experience is enhanced. For example, the user may gain more information about the product or service in the commercial by reading the information in the trick mode status bar. This information may entice the user to return to the play mode to obtain interactive content regarding the product or service.

In one implementation described herein, the information regarding the interactive content associated with the commercial is embedded in the media stream that includes the television broadcast. For example, a technology, such as the Enhanced Television (ETV) Binary Interchange Format (EBIF) developed under the OpenCable project of Cable Television Laboratories, Inc., may be used to embed, transmit, parse, and/or render the information. While the description herein will focus on EBIF, other technologies may be used to embed, transmit, parse, and/or render the information in other implementations.

Figure 2:
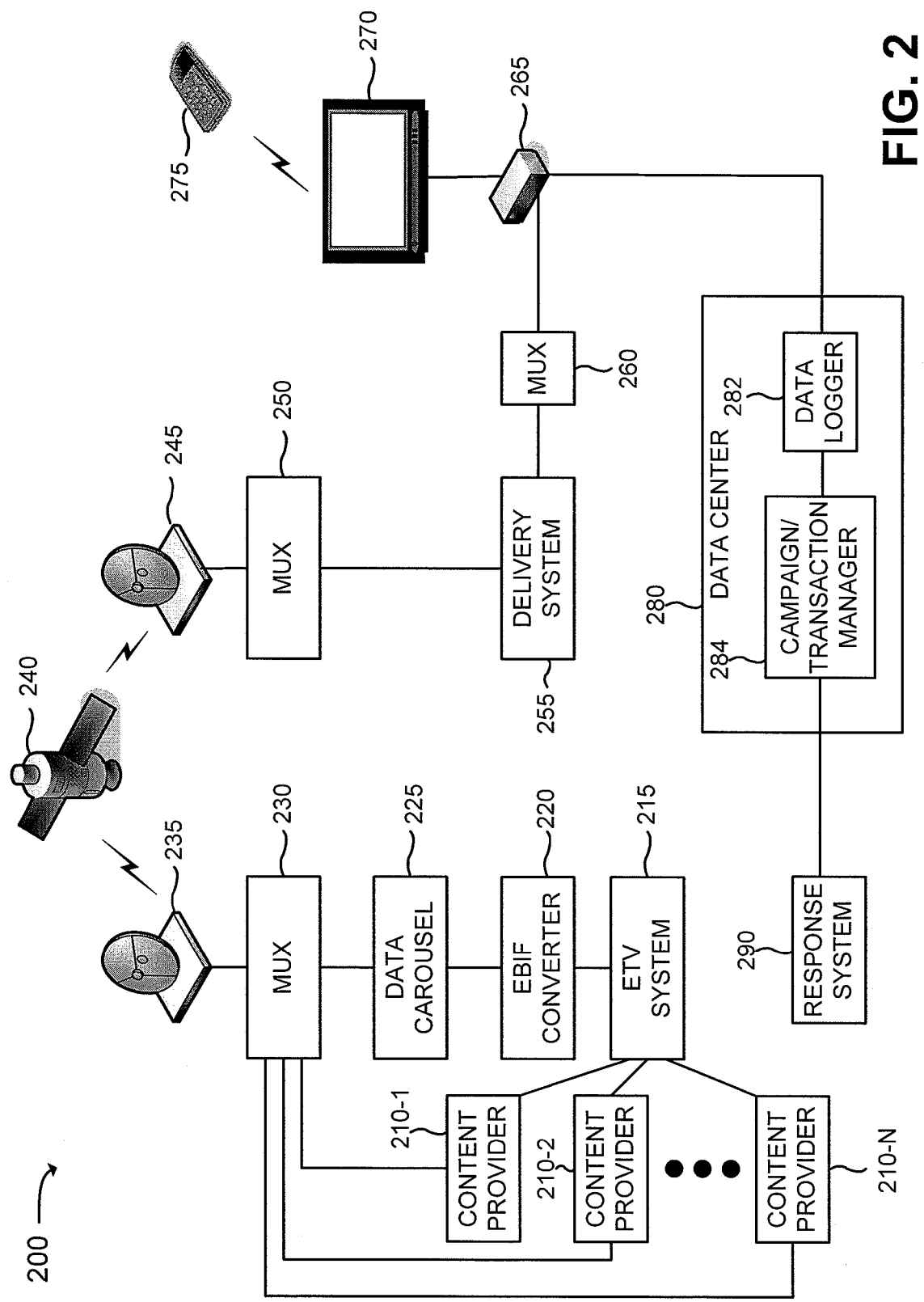
FIG. 2 is a diagram of an exemplary environment in which systems and methods described herein may be implemented.

FIG. 2 is a diagram of an exemplary environment 200 in which systems and methods described herein may be implemented. Environment 200 may include content providers 210-1, 210-2, . . . , 210-N (where N≥1) (collectively referred to as "content providers 210"), ETV system 215, EBIF converter 220, data carousel 225, multiplexer (MUX) 230, satellite uplink 235, satellite 240, satellite downlink 245, MUX 250, delivery system 255, MUX 260, video client 265, video display device 270, remote control 275, data center 280, and response system 290. In practice, environment 200 may include more, fewer, different, or differently arranged devices than are shown in FIG. 2. For example, environment 200 may include a transmission medium that includes devices other than satellites and satellite uplinks and downlinks.

Also, two or more of these devices may be implemented within a single device, or a single device may be implemented as multiple, distributed devices. Further, while FIG. 2 shows direct connections between devices, any of these connections can be indirectly made via a network, such as a local area network, a wide area network (e.g., the Internet), a telephone network (e.g., the Public Switched Telephone Network (PSTN) or a cellular network), an ad hoc network, a fiber optic network (e.g., a fiber optic service (FiOS) network), or a combination of networks.

Content providers 210 may include any type or form of content providers. For example, content providers 210 may include free television broadcast providers (e.g., local broadcast providers, such as NBC, CBS, ABC, and Fox), for-pay television broadcast providers (e.g., TNT, ESPN, HBO, Cinemax, CNN, etc.), and/or Internet-based content providers (e.g., streaming content from web sites). Content providers 210 may produce media streams (e.g., television broadcasts). A "media stream," as used herein, may refer to stream of content that includes at least video content, but may also include audio content and/or text content.

ETV system 215 may include a device that may work with content providers 210 to generate interactive content for the media streams. For example, ETV system 215 may generate interactive content and associated signaling information (e.g., triggers) that are associated with the media streams. EBIF converter 220 may include a device that may process the interactive content and associated signaling information so that they conform to the EBIF standard. EBIF converter 220 may output EBIF-compliant content and signaling information. Data carousel 225 may include a device that may process the EBIF-compliant content and signaling information to generate multiple data carousels on multiple separate data packet identifiers (PIDs) as part of an MPEG-2 single program transport stream (SPTS). For example, a first PID may contain EBIF-complaint content and a second PID may contain the signaling information.

MUX 230 may include a multiplexer device that may receive the media streams from content providers 210 and the EBIF-compliant content and associated signaling information from data carousel 225 and multiplex, or otherwise combine, this data to create an enhanced media stream. Satellite uplink 235 may include a satellite transmitter that may receive the enhanced media stream, process the enhanced media stream for transmission, and transmit the enhanced media stream to satellite 240. Satellite 240 may include a stationary or orbiting communication satellite that may receive the enhanced media stream and relay the enhanced media stream to satellite downlink 245.

Satellite downlink 245 may include a satellite receiver that may receive the enhanced media stream from satellite 240, process the enhanced media stream for transmission, and transmit the enhanced media stream to MUX 250. MUX 250 may include a multiplexer device that may process the enhanced media stream for transmission to delivery system 255.

Delivery system 255 may include a device that may receive the enhanced media stream and process the enhanced media stream for transmission according a particular protocol, such as the asynchronous serial interface format. In another implementation, delivery system 255 may work with one or more other devices to generate interactive content and associated signaling information and/or to embed interactive content and associated signaling information into a media stream. MUX 260 may include a multiplexer device that may perform some form of modulation on the enhanced media stream, such as quadrature amplitude modulation.

Video client 265 may include a device that may receive and process the enhanced media stream from MUX 260 for display on video display device 270. In one implementation, video client 265 may take the form of a set-top box (STB). In another implementation, video client 265 may include a computer device, a cable card, a communication device (e.g., a telephone, such as a voice over Internet protocol (VoIP) telephone or a mobile telephone, or a personal digital assistant (PDA)), or the like.

Video client 265 may perform decoding and/or decryption functions on the enhanced media stream received from MUX 260. Video client 265 may also perform functions relating to identifying the interactive content and signaling information embedded in the enhanced media stream and presenting information relating to the interactive content on video display device 270. Video client 265 may further perform other functions, such as DVR functions relating to the storage and playback of video content. Video client 265 may further perform Internet-based content retrieval functions, such as searching and/or retrieving web pages or other Internet-based content.

Video client 265 may also provide information to data center 280. For example, video client 265 may provide information regarding a user's interaction with the interactive content of the enhanced media stream and/or information regarding the television programs that the user is watching and/or recording. This information may be collected only with the user's express consent. In one implementation, video client 265 may transmit information regarding remote control button presses, channel selections, requests for information regarding interactive content, and the like.

Video display device 270 may include a device that may receive and reproduce video and/or audio signals. In one implementation, video display device 270 may take the form of a television. In another implementation, video display device 270 may include a computer monitor, a display of a communication device (e.g., a telephone, such as a VoIP telephone or a mobile telephone, or a PDA), or the like.

Remote control 275 may include a device that may remotely control the operation of video client 265 and/or video display device 270. Remote control 275 may take the form of a remote control device similar to a television or STB remote control device, a game controller, a keyboard, a keypad, a PDA, a mobile telephone, or the like. Remote control 275 may provide commands to video client 265 and/or video display device 270 by transmitting signals, such as wireless signals (e.g., infrared or Bluetooth) or signals transmitted over wires (e.g., over a universal serial bus (USB) interface or the like), to a reader associated with video client 265 and/or video display device 270.

Data center 280 may collect information from video client 265. In one implementation, data center 280 may include a data logger 282 and/or a campaign/transaction manager 284. Data logger 282 may collect and store the information from video client 265. Campaign/transaction manager 284 may manage rules of an advertisement campaign, manage billing or connectivity to third parties for information transfer, or the like. For example, campaign/transaction manager 284 may be responsible for sending a user's address to an advertiser so that the advertiser can send the user something in the mail, like a coupon.

Response system 290 may include a device that can process requests for information from data center 280. For example, response system 290 may receive the user's address from data center 280 and send that address to the advertiser.

Figure 3:
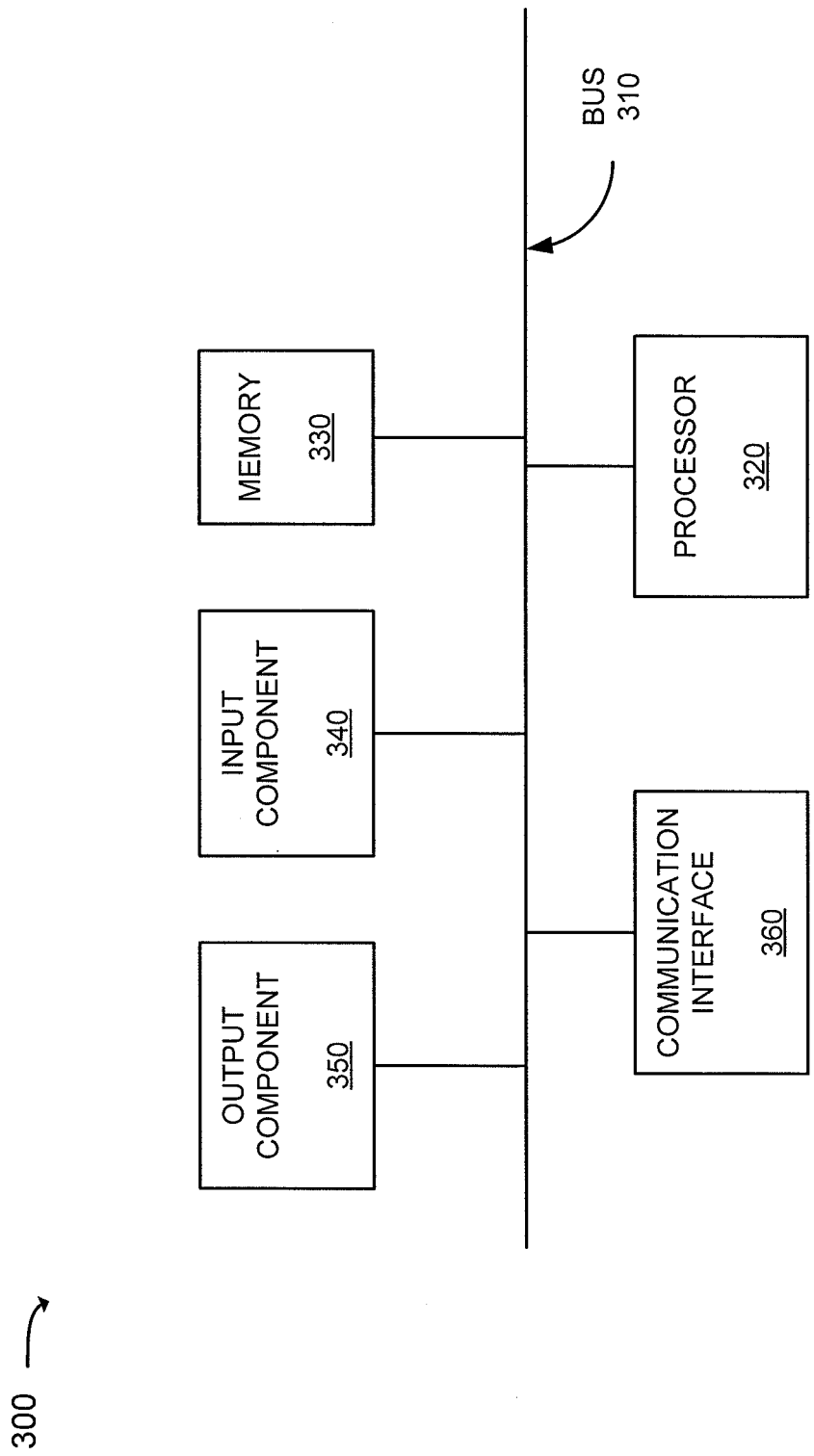
FIG. 3 is a diagram of exemplary components of a device of FIG. 2.

FIG. 3 is a diagram of exemplary components of a device 300. Each of the devices illustrated in FIG. 2 may include one or more devices 300.

Device 300 may include a bus 310, a processor 320, a memory 330, an input component 340, an output component 350, and a communication interface 360. In another implementation, device 300 may include more, fewer, different, or differently arranged components.

Bus 310 may include a path that permits communication among the components of device 300. Processor 320 may include a processor, microprocessor, or processing logic (e.g., a field-programmable gate array (FPGA), an application-specific integrated circuit (ASIC), etc.) that may interpret and execute instructions. Memory 330 may include a random access memory (RAM), a read only memory (ROM), or another type of dynamic or static storage device (e.g., a flash, magnetic, or optical memory) that may store information and/or instructions for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. Communication interface 360 may include any transceiver-like mechanism, such as a transceiver and/or a separate receiver and transmitter, that enables device 300 to communicate with other devices and/or systems. For example, communication interface 360 may include an Ethernet interface, an optical interface, a coaxial interface, an infrared interface, a radio frequency (RF) interface, a USB interface, or the like.

As will be described in detail below, device 300, as implemented within one or more of the devices in FIG. 2, may perform certain operations relating to providing users with interactive content regarding media content (e.g., commercials and/or television programs) when the users are viewing the media content in a trick mode. Device 300 may perform these operations in response to processor 320 executing software instructions contained in a computer-readable medium, such as memory 330. A computer-readable medium may be defined as a physical or logical memory device.

The software instructions may be read into memory 330 from another computer-readable medium or from another device via communication interface 360. The software instructions stored in memory 330 may cause processor 320 to perform processes that are described below. Alternatively, hardwired circuitry may be used in place of or in combination with software instructions to implement processes described herein. Thus, implementations described herein are not limited to any specific combination of hardware circuitry and software.

Figure 4:
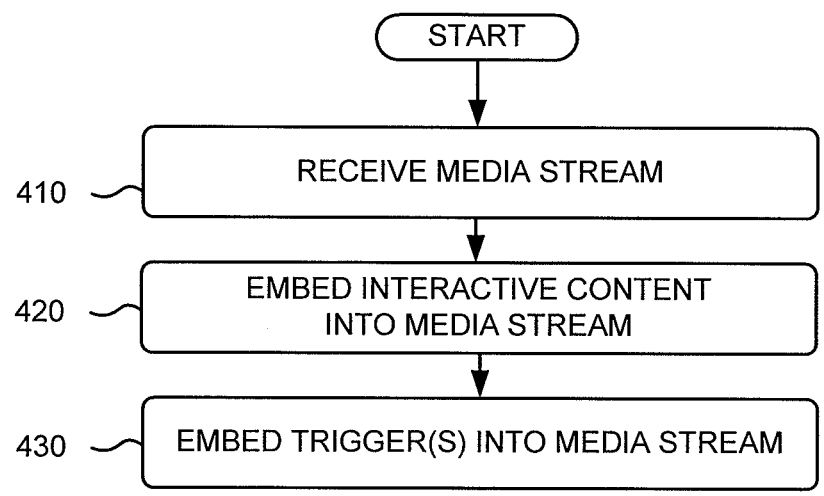
FIG. 4 is a flowchart of an exemplary process for embedding interactive content and one or more triggers in a media stream.

FIG. 4 is a flowchart of an exemplary process for embedding interactive content and one or more triggers in a media stream. In one implementation, one or more of the process blocks of FIG. 4 may be performed by one or more components of a content provider 210, ETV system 215, EBIF converter 220, data carousel 225, and/or MUX 230. In another implementation, one or more of the process blocks of FIG. 4 may be performed by one or more other devices in environment 200 of FIG. 2, such as delivery system 255 or one or more devices (not shown in FIG. 2) that may communicate with delivery system 255.

The process may including receiving a media stream (block 410). Content providers 210 may generate media streams. In one implementation, a media stream may contain content from a free television broadcast provider, a for-pay television broadcast provider, or an Internet-based content provider.

Interactive content and one or more triggers may be embedded into the media stream to create an enhanced media stream (blocks 420 and 430). While blocks 420 and 430 are shown as separate blocks, the interactive content and the trigger(s) may be simultaneously, or substantially simultaneously, embedded into the media stream. In one implementation, the interactive content may take the form of text and/or graphics (e.g., a logo or another graphic) that is/are related to the content of the media stream. The interactive content presented during the trick mode may be the same as, or different from, the interactive content presented during the normal play mode. The triggers may be used to indicate that interactive content is available. The triggers may be used in connection with commercials and/or television programs. The triggers to identify interactive content for the trick mode may be the same as, or different from, the triggers used to identify interactive content for the normal play mode.

The interactive content and/or triggers may be embedded at certain places within the media stream. For example, the interactive content and/or triggers may be embedded based on what frames are accessed during different trick mode speeds (e.g., fast forward speeds or rewind speeds). For example, for fast forward speeds of 2×, 4×, 8×, 16×, and 32×, the interactive content and/or triggers may be embedded at the frames that would be accessed at these speeds, such as the I-frames corresponding to these speeds. It may also be beneficial to add the interactive content and/or triggers to other frames (e.g., surrounding I-frames) to ensure that the information that is presented appears on video display device 270 for a legible amount of time.

Video client 265 may include an element (e.g., software) to recognize the triggers and parse the interactive content embedded within the enhanced media stream. Video client 265 may present information regarding the interactive content on video display device 270 during the trick mode. Video client 265 may present the same information, other information, or no information on video display device 270 during the normal play mode.

Figure 5:
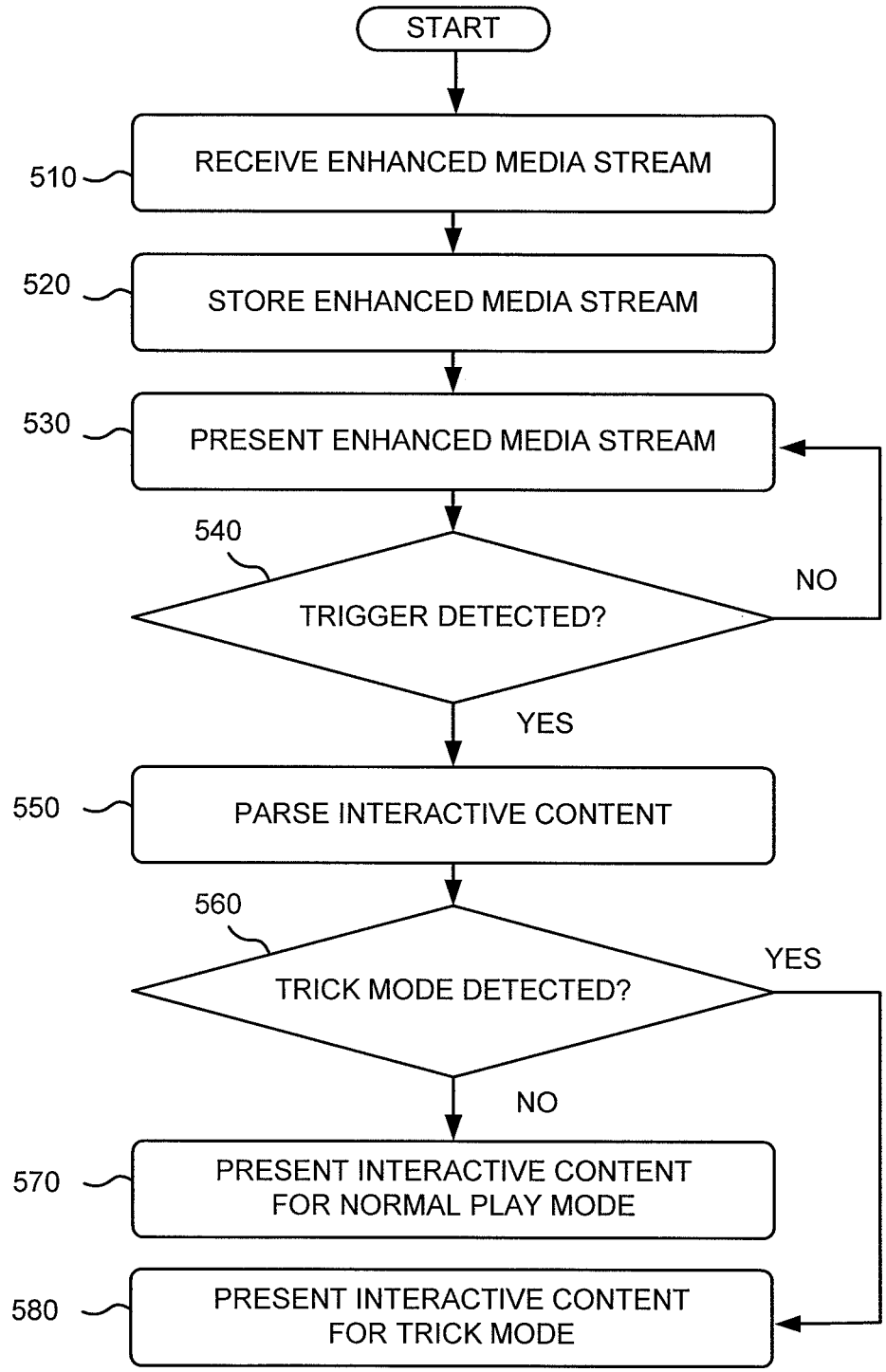
FIG. 5 is a flowchart of an exemplary process for presenting interactive content during a trick mode.

FIG. 5 is a flowchart of an exemplary process for presenting interactive content during a trick mode. In one implementation, one or more of the process blocks of FIG. 5 may be performed by components within video client 265. In another implementation, one or more of the process blocks of FIG. 5 may be performed by one or more other devices shown in environment 200 of FIG. 2. Also, while FIG. 5 shows a number of blocks in a particular order, some of the blocks may be performed in parallel and/or one or more of the blocks may be performed in an order different than the order shown in FIG. 5.

The process may include receiving an enhanced media stream (block 510). For example, video client 265 may receive a media stream that includes embedded interactive content and triggers. The enhanced media stream may be stored (block 520). For example, video client 265 may buffer the enhanced media stream for substantially real time presentation on video display device 270 (where "real time" is measured with respect to receipt of the media stream). Alternatively, or additionally, video client 265 may use its DVR functionality to record the enhanced media stream in memory for later presentation on video display device 270. In this case, video client 265 may store not only the media content (e.g., video and audio content), but may also store the interactive content and triggers associated with the enhanced media stream.

The enhanced media stream may be presented (block 530). For example, video client 265 may provide the media content of the enhanced media stream for presentation on video display device 270. In this case, video client 265 may send the media content to video display device 270 so that video display device 270 can display the video content and audibly reproduce the audio content within the media content.

During presentation of the enhanced media stream, it may be determined whether a trigger is detected (block 540). For example, video client 265 may include a software agent whose function is to monitor a media stream, which is being presented to video display device 270, for triggers. This software agent may be configured to monitor not only a live media stream (i.e., a media stream that is being presented to video display device 270 in substantially real time), but also a recorded media stream (i.e., a media stream that has been recorded and the recorded media stream is being presented in non-real time to video display device 270).

If no trigger is detected (block 540—NO), then the enhanced media stream may continue to be presented (block 530) until a trigger is detected. If a trigger is detected (block 540—YES), then the interactive content within the enhanced media stream may be parsed (block 550). For example, upon detecting a trigger, the software agent may invoke a client application that can parse the interactive content from within the enhanced media stream. This client application may process the interactive content to determine the information included in the interactive content to present on video display device 270. Alternatively, the software agent can parse and process the interactive content itself.

It may be determined whether the trick mode is detected (block 560). Video client 265 may include a trick mode agent that may monitor the user's activity for initiation of the trick mode. The trick mode agent may be the same as, or different from, the software agent and/or the client application. In one implementation, the trick mode agent may monitor the signals transmitted by remote control 275 for a signal that indicates that the user has pressed a button on remote control 275 to initiate the trick mode. This signal may indicate that the user has requested to fast forward, rewind, or pause the presentation of the enhanced media stream.

If the trick mode has not been detected (block 560—NO), then interactive content may be presented for normal play mode (block 570). For example, the client application may superimpose information associated with the interactive content on the video content of the enhanced media stream during the normal play mode. The information may be as simple as text that instructs the user as to how to obtain additional information or as complicated as graphics or video associated with the interactive content. It may be beneficial for the superimposed information to be non-intrusive to avoid distracting from the user's television experience. In another implementation, no interactive content is presented during the normal play mode.

If the trick mode has been detected (block 560—YES), then interactive content may be presented for the trick mode (block 580). For example, the client application may modify a trick mode status bar (e.g., similar to the trick mode status bar shown in FIG. 1) to include information associated with the interactive content. In one implementation, the information may be directly related to the media content of the enhanced media stream currently being presented on video display device 270. For example, the information might be related to a commercial or a product in a television program currently being presented on video display device 270. The client application may superimpose the modified trick mode status bar on the video content of the enhanced media stream during the trick mode.

In another implementation, the client application may generate an overlay that includes information associated with the interactive content. The information may be directly related to the media content of the enhanced media stream currently being presented on video display device 270. The client application may superimpose the overlay on the video content of the enhanced media stream during the trick mode.

If the user desires additional information regarding the information in the modified trick mode status bar, then the user may instruct video client 265 to present information regarding the interactive content. In one implementation, the information may be presented by returning to the normal play mode. During the normal play mode, video client 265 may present information regarding the interactive content, as was described with regard to block 570. In another implementation, the information may be presented without returning to the normal play mode. In this case, video client 265 may automatically pause presentation of the media content (or automatically return to normal play mode) and cause the information regarding the interactive content to be presented instead of, or in addition to, the paused media content (or the media content in normal play mode).

FIGS. 6-13 are diagrams of examples in which interactive content is presented. With regard to FIGS. 6-8, assume that a user is watching a football game (e.g., the Steelers versus the Patriots) on a video display device (e.g., video display device 270), and a commercial comes on for International Package Service (IPS). Assume that there is interactive content, associated with the commercial, which is embedded within the media stream containing the commercial. The user is not interested in the commercial, so the user may press the fast forward button on his remote control (e.g., remote control 275). The remote control may send a command to the video client (e.g., video client 265), which may enter the trick mode.

Figure 6:
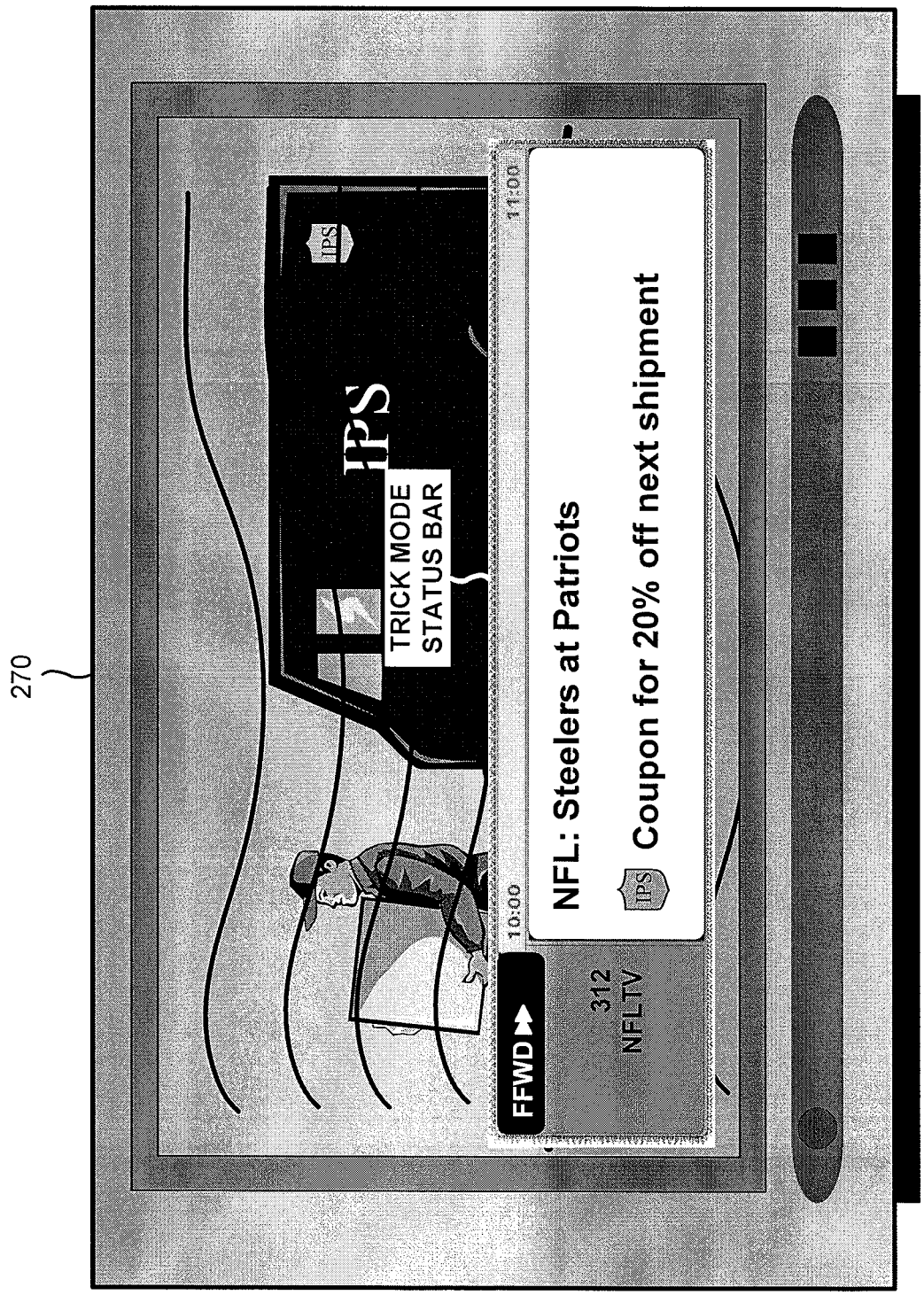
FIGS. 6-13 are diagrams of examples in which interactive content is presented.

In one implementation, the video client may generate a modified trick mode status bar that includes information regarding the interactive content embedded within the media stream (e.g., the IPS logo along with text indicating "Coupon for 20% off next shipment," as shown in FIG. 6). The video client may fast forward through the commercial and cause the modified trick mode status bar to be presented, as shown in FIG. 6. The modified trick mode status bar may be presented for the duration, or some portion, of the commercial. It may be beneficial for the modified trick mode status bar to be presented at least long enough for the user to casually read the contents of the modified trick mode status bar.

If the user is interested in obtaining additional information regarding the interactive content, the user may cease the trick mode. For example, the user may press the fast forward button, or the play button, on the remote control to indicate that the user desires to stop the trick mode. The remote control may send a command to the video client, which may enter the normal play mode.

Figure 7:
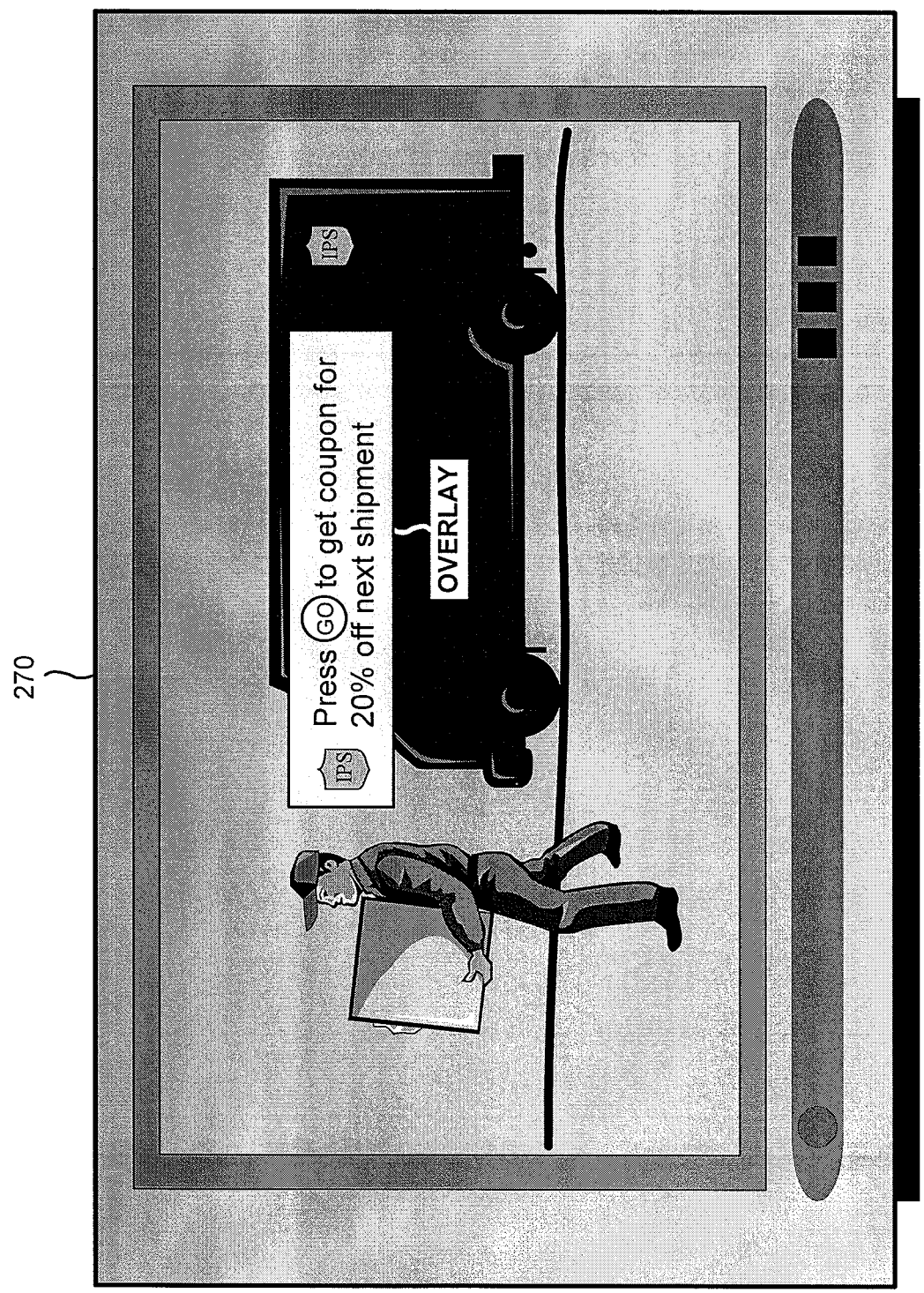

The video client may return to playing the commercial on the video display device, as shown in FIG. 7. The video client may stop presenting the trick mode status bar. The video client may generate an overlay that includes information regarding the interactive content embedded within the media stream (e.g., the IPS logo along with text indicating "Press GO to get coupon for 20% off next shipment," as shown in FIG. 7). The video client may cause the overlay to be presented superimposed on the commercial, as shown in FIG. 7. The overlay may be presented for the duration, or some portion, of the commercial. It may be beneficial for the overlay to be presented at least long enough for the user to casually read the contents of the overlay. If the user desires the interactive content, the user can press a particular button (e.g., the GO button) on his remote control.

Figure 8:
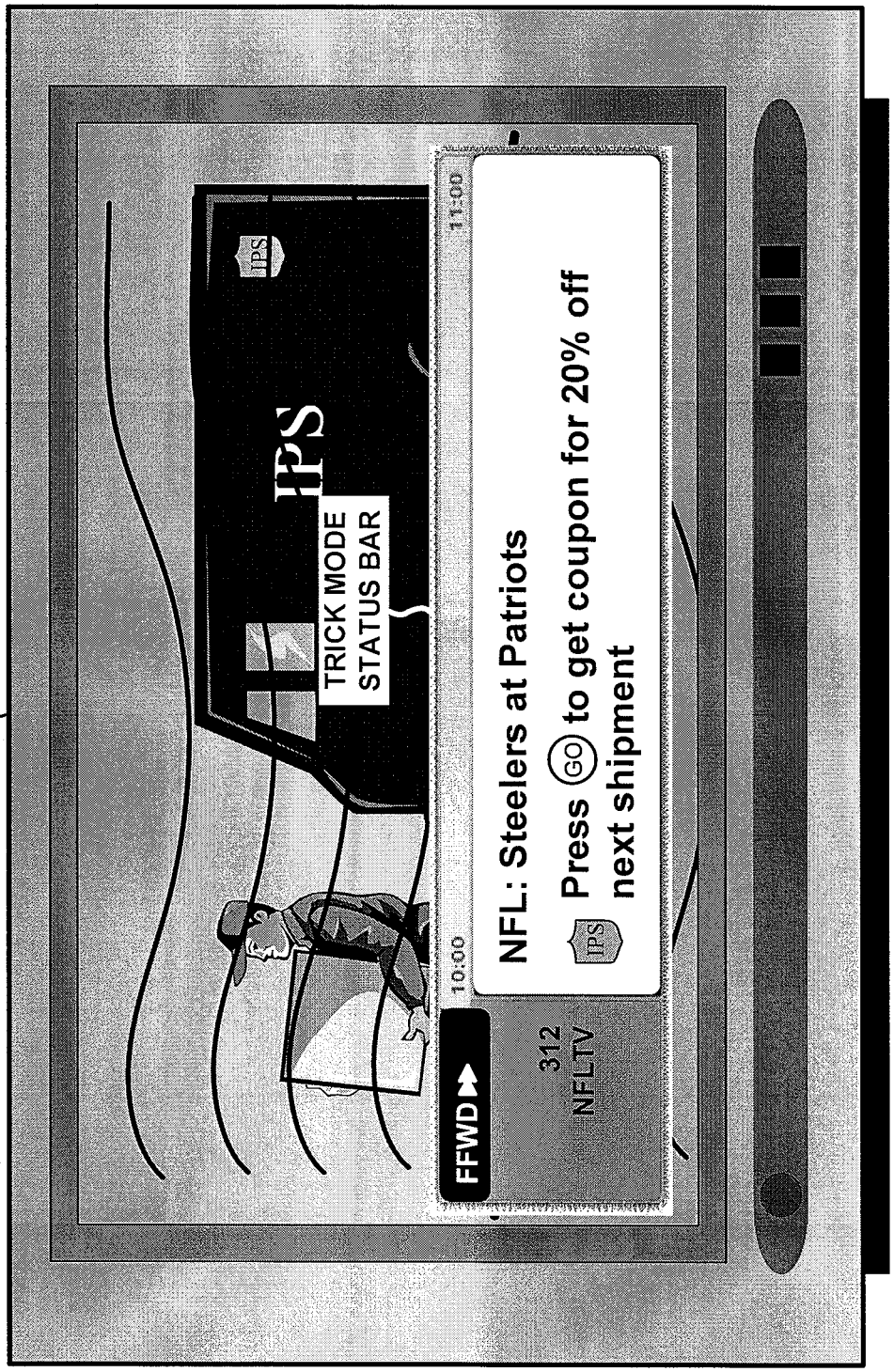

In another implementation, the video client may generate a modified trick mode status bar that includes information regarding the interactive content embedded within the media stream and information regarding how to obtain that interactive content (e.g., the IPS logo along with text indicating "Press GO to get coupon for 20% off next shipment," as shown in FIG. 8). The video client may fast forward through the commercial and cause the modified trick mode status bar to be presented, as shown in FIG. 8. The modified trick mode status bar may be presented for the duration, or some portion, of the commercial. It may be beneficial for the modified trick mode status bar to be presented at least long enough for the user to casually read the contents of the modified trick mode status bar.

If the user is interested in obtaining additional information regarding the interactive content, the user may follow the instructions in the modified trick mode status bar (e.g., press GO on the remote control). The remote control may send a command to the video client, which may cause information regarding the interactive content to be presented instead of, or in addition to, the commercial (e.g., paused or in normal play mode).

Figure 9:
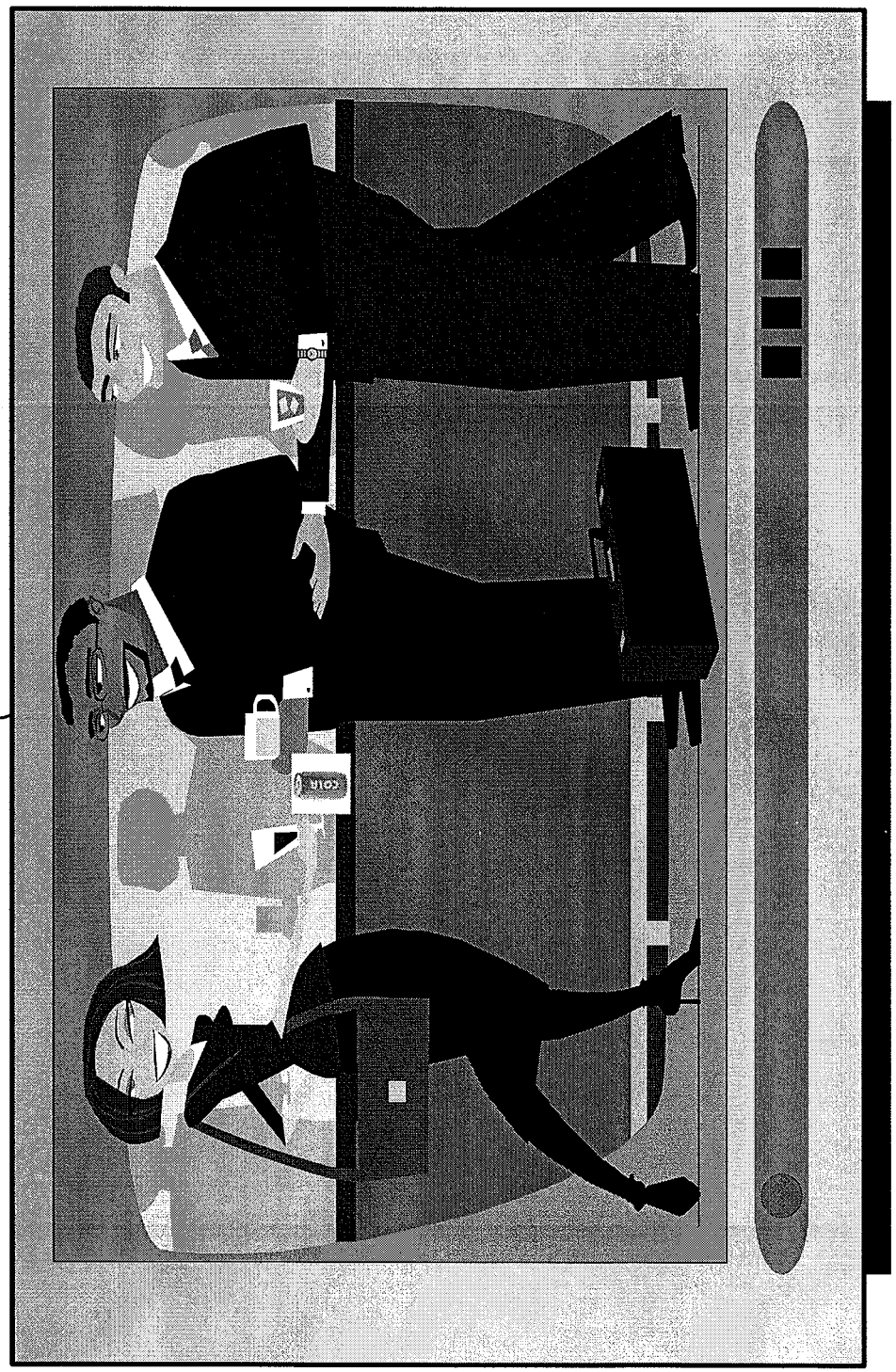

With regard to FIGS. 9-13, assume that a user is watching a television program (e.g., Grey's Academy) on a video display device (e.g., video display device 270). Assume that there is interactive content, associated with the television program, that is embedded within the media stream containing the television program, and that this interactive content is associated with a product presented within the television program (e.g., the Cola on the bar). During the normal play mode, the video client (e.g., video client 265) may present the television program on the video display device with no indication of the interactive content that is available, as shown in FIG. 9. Alternatively, the video client may present a graphic, such as an icon or another type of small overlay, superimposed on the television program to indicate that the interactive content is available.

During the television program, the user may desire to enter the trick mode by, for example, pressing a button on her remote control (e.g., remote control 275) to pause, fast forward, or rewind presentation of the television program. Assume that the user presses a button to rewind the presentation of the television program. In this case, the remote control may send a command to the video client, which may enter the trick mode.

Figure 10:
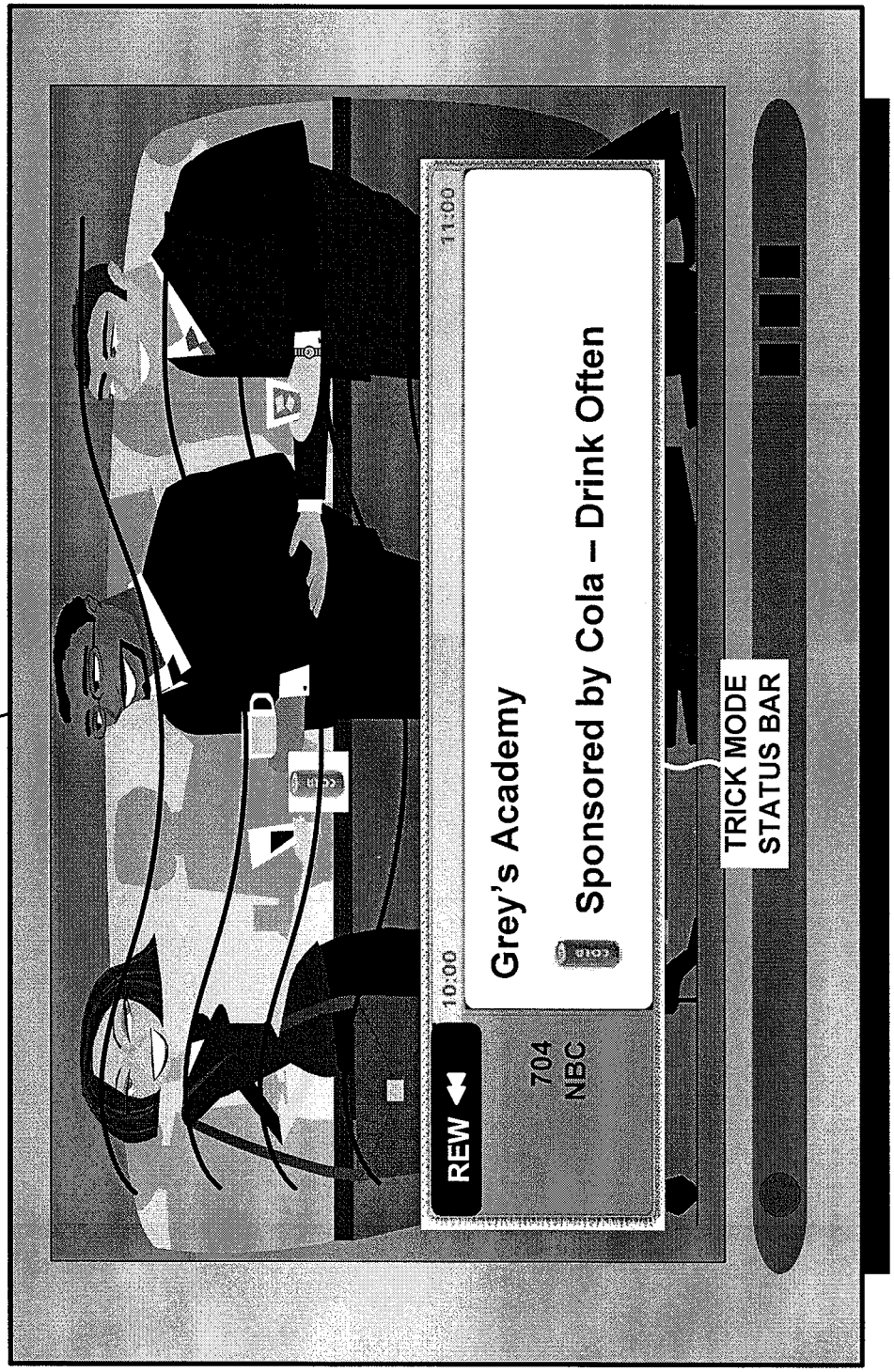

The video client may generate a modified trick mode status bar that includes information regarding the interactive content embedded within the media stream (e.g., a graphic associated with the Cola and text, such as "Sponsored by Cola—Drink Often," as shown in FIG. 10). The video client may rewind the presentation of the television program and cause the modified trick mode status bar to be presented, as shown in FIG. 10. The modified trick mode status bar may be presented for the duration, or some portion, of the trick mode. It may be beneficial for the modified trick mode status bar to be presented at least long enough for the user to casually read the contents of the modified trick mode status bar. When the user stops the trick mode, the video client may return to presenting the television program unencumbered by any interactive content, such as shown in FIG. 9.

Figure 11:
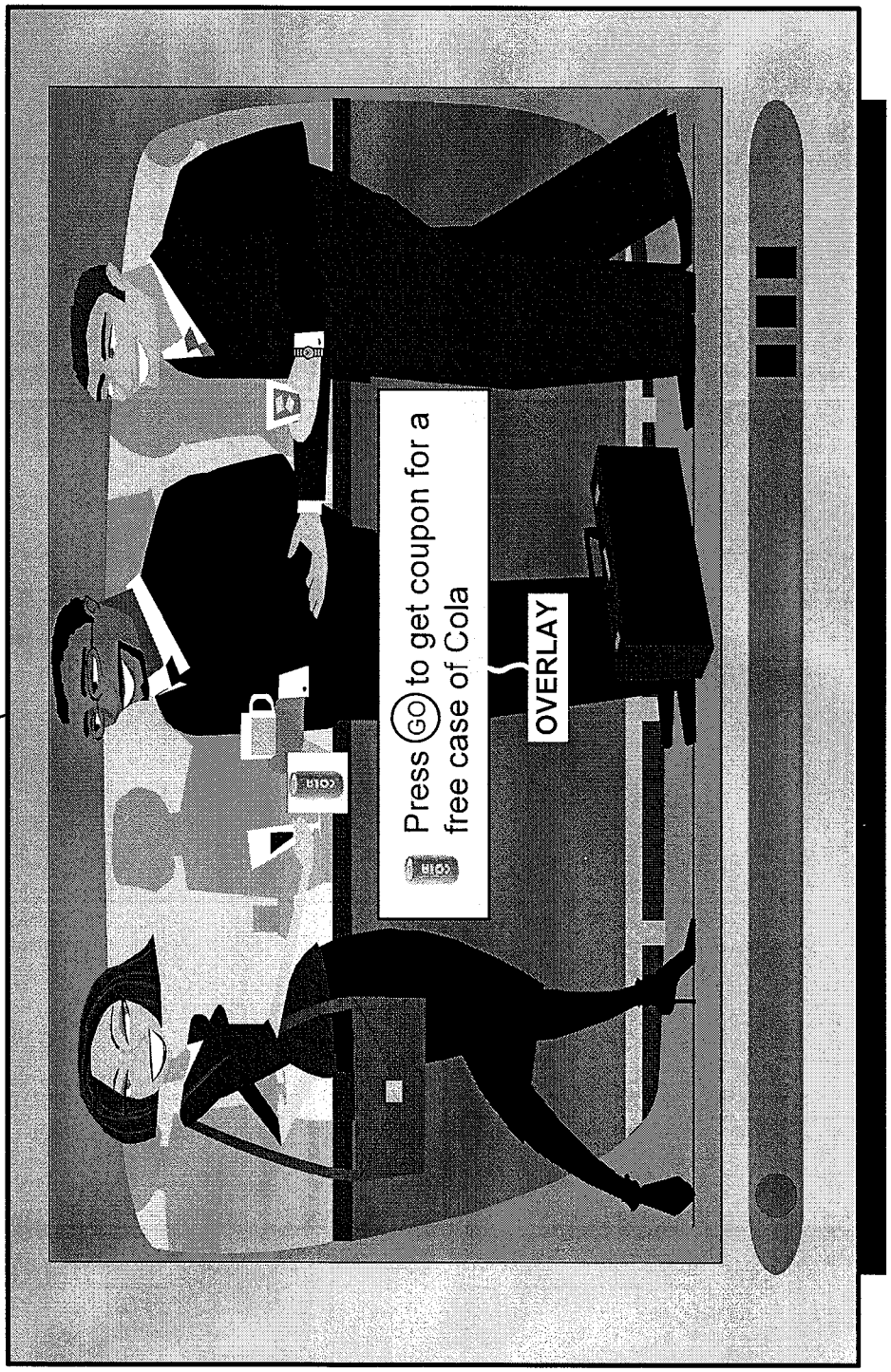

In an alternative implementation, when the user stops the trick mode, the video client may return to playing the television program on the video display device, as shown in FIG. 11. In this implementation, however, the video client may generate an overlay that includes information regarding the interactive content embedded within the media stream (e.g., the Cola graphic along with text indicating "Press GO to get coupon for a free case of Cola," as shown in FIG. 11). The video client may cause the overlay to be presented superimposed on the television program, as shown in FIG. 11. The overlay may be presented for a particular period of time, after which the overlay may be removed. It may be beneficial for the overlay to be presented at least long enough for the user to casually read the contents of the overlay. If the user desires the interactive content, the user can press a particular button (e.g., the GO button) on his remote control.

Figure 12:
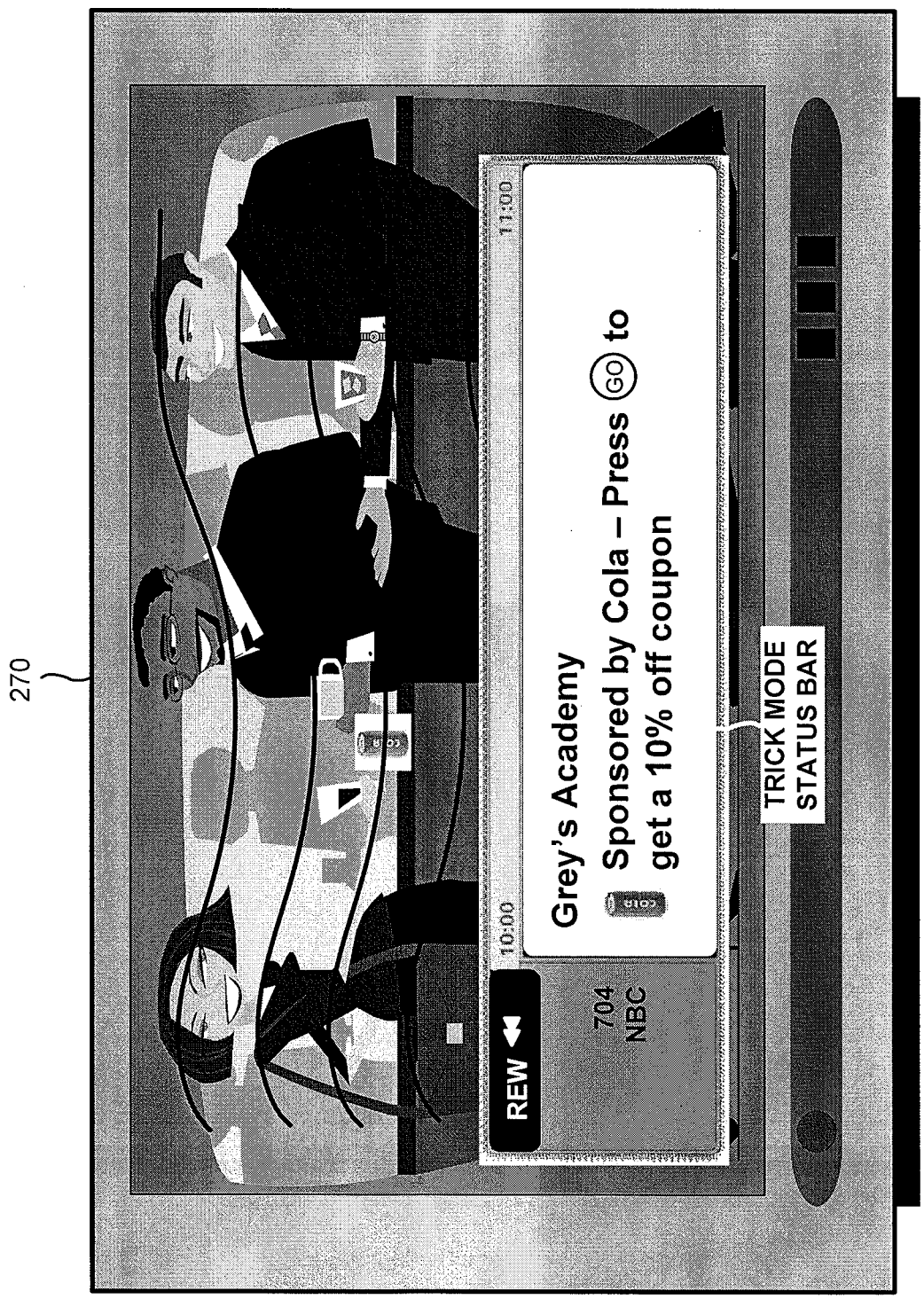

In another implementation, the video client may generate a modified trick mode status bar that includes information regarding the interactive content embedded within the media stream and information regarding how to obtain that interactive content (e.g., the Cola graphic along with text indicating "Sponsored by Cola—Press GO to get a 10% off coupon," as shown in FIG. 12). The video client may rewind the presentation of the television program and cause the modified trick mode status bar to be presented, as shown in FIG. 12. The modified trick mode status bar may be presented for the duration, or some portion, of the trick mode. It may be beneficial for the modified trick mode status bar to be presented at least long enough for the user to casually read the contents of the modified trick mode status bar.

If the user is interested in obtaining additional information regarding the interactive content, the user may follow the instructions in the modified trick mode status bar (e.g., press GO on the remote control). The remote control may send a command to the video client, which may cause information regarding the interactive content to be presented instead of, or in addition to, the television program (e.g., paused or in normal play mode).

Figure 13:
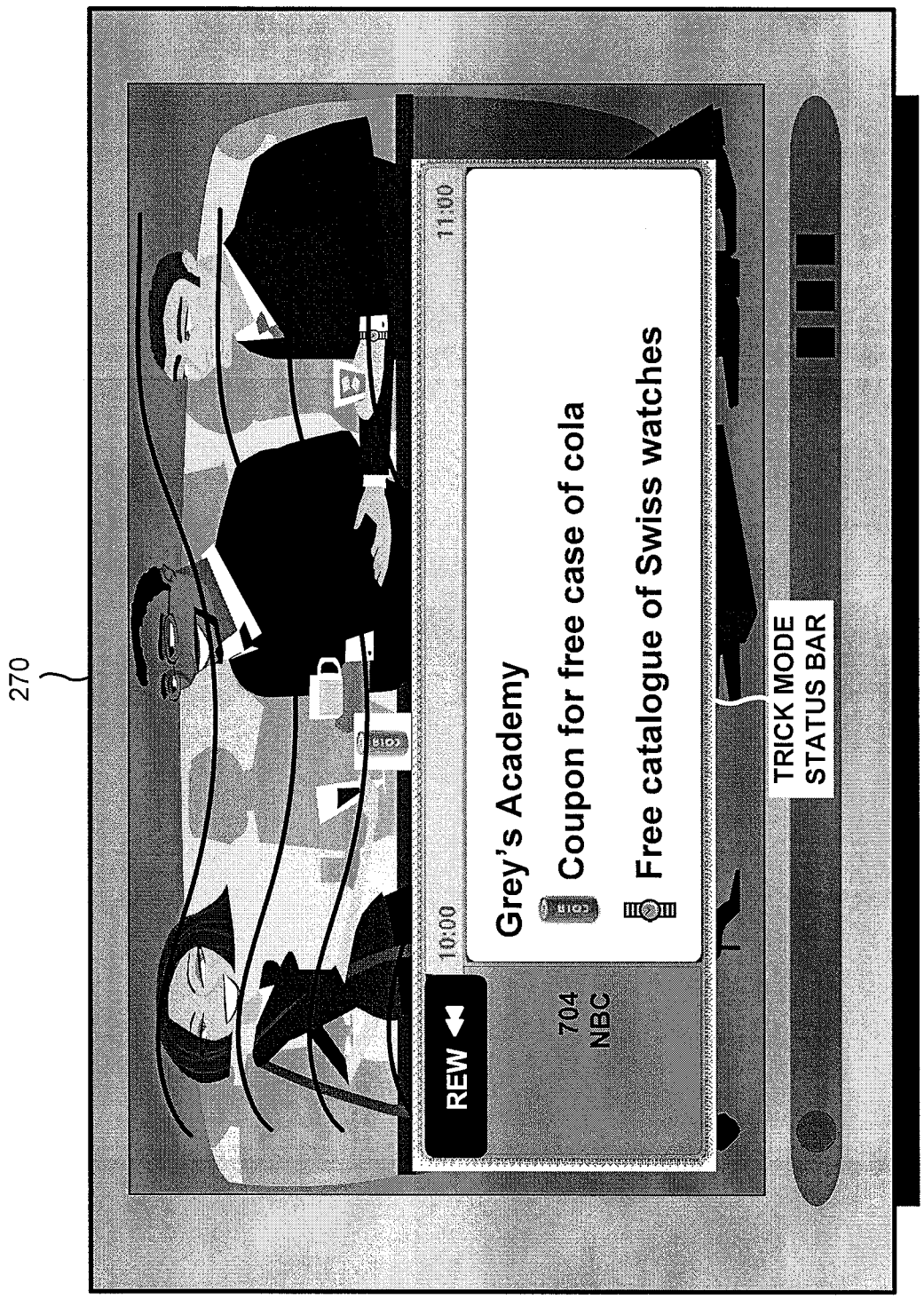

It may be possible for there to be interactive content relating to multiple products in the television program, such as the Cola on the bar and a watch the gentleman on the right is wearing, as shown in FIG. 13. This time, when the user instructs the video client to enter the trick mode, the video client may generate a modified trick mode status bar that includes information regarding the interactive content relating to both of the products (e.g., a graphic associated with the Cola and text, such as "Coupon for free case of cola;" and a graphic associated with the watch and text, such as "Free catalogue of Swiss watches," as shown in FIG. 13).

The video client may pause, rewind, or fast forward the presentation of the television program and cause the modified trick mode status bar to be presented, as shown in FIG. 13. The modified trick mode status bar may be presented for the duration, or some portion, of the trick mode. It may be beneficial for the modified trick mode status bar to be presented at least long enough for the user to casually read the contents of the modified trick mode status bar.

In one implementation, if the user is interested in obtaining additional information regarding the interactive content associated with one or more of these products, the user may exit the trick mode. For example, the user may press the pause/rewind/fast forward button, or the play button, on the remote control to indicate that the user desires to stop the trick mode. The remote control may send a command to the video client, which may enter the normal play mode, as described above with regard to FIG. 11.

Implementations described herein may present information regarding available interactive content to users during the trick mode.

The foregoing description provides illustration and description, but is not intended to be exhaustive or to limit the invention to the precise form disclosed. Modifications and variations are possible in light of the above teachings or may be acquired from practice of the invention.

For example, certain screen displays have been presented with regard to FIGS. 6-13. These screen displays are purely exemplary in nature and merely serve to facilitate the description of the presentation of information relating to available interactive content.

Further, certain terms, like "users" and "consumers," have been referred to above. It should be understood that these terms are intended to be interchangeable.

Moreover, the term "component," as used herein, is intended to be broadly construed as hardware, firmware, or a combination of hardware and software.

Also, it has been described that a user can press a button on a remote control to cause an operation to occur. In another implementation, a button on a video client, such as a set-top box, or a video display device, such as a television, may cause the same operation to occur.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a processor, an enhanced media stream that includes:
      media content that includes a commercial, and
      interactive content associated with the commercial;
   presenting, by the processor, the media content for display on a video display device;
   detecting, by the processor, a first user input requesting pausing, rewinding, or fast forwarding, on the video display device, the presented media content;
   presenting, by the processor and based on detecting the first user input, first information, associated with the interactive content, for display on the video display device,
      the presented first information being superimposed on the presented media content during the pausing, rewinding, or fast forwarding of the presented media content;
   detecting, by the processor and while presenting the first information, a second user input requesting stopping of the pausing, rewinding, or fast forwarding of the presented media content;
   stopping, by the processor and based on receiving the second user input, the pausing, rewinding, or fast forwarding of the presented media content;
   determining, by the processor, whether stopping the pausing, rewinding, or fast forwarding of the presented media content occurs while the commercial is being presented for display; and
   presenting, by the processor and when the stopping of the pausing, rewinding, or fast forwarding occurs while the commercial is being presented for display, second information, associated with the interactive content, for display on the video display device,
      the second information being different from the first information, and
      the second information being superimposed on the presented commercial.

2. The method of claim 1, where the enhanced media stream further includes a trigger that indicates that the interactive content is available for the media content; and
   where presenting the first information includes:
      detecting the trigger when presenting the media content, and
      presenting the first information further based on detecting tagger.

3. The method of claim 2, further comprising:
   parsing the interactive content, based on detecting the trigger, to identify the first information and the second information.

4. The method of claim 1, further comprising:
   storing the enhanced media stream to a memory; and
   where presenting the media content includes:
      reading the stored media content from the memory, and
      providing the read media content for display by the video display device.

5. The method of claim 1, where presenting the first information includes:
   generating a first overlay that includes the first information and information regarding a status of the pausing, rewinding, or fast forwarding of the presented media content, and
   presenting the first overlay superimposed on the at least one of pausing, rewinding, or fast forwarding of the presented media content.

6. The method of claim 5, where presenting the second information further includes:
   generating a second overlay that includes the second information,
      the second overlay being different from the first overlay; and
   presenting the second overlay superimposed on the presented media content after stopping the pausing, rewinding, or fast forwarding of the presented media content.

7. The method of claim 1, where the enhanced media stream includes first portions and second portions, the second portions including the media content,
   where the interactive content is included in the first portions and is not included in the second portions,
   where presenting the first information further includes:
      accessing, based on detecting the first user input, the first portions of the enhanced media stream, and
      determining the first information based on accessing the first portions of the enhanced media stream, and
   where presenting the media content includes accessing the second portions of the enhanced media stream.

8. The method of claim 1, where presenting the first information includes:
   presenting the first information only during the pausing, rewinding, or fast forwarding of the commercial,
      the first information not be presented during the pausing, rewinding, or fast forwarding of a portion of the presented media content that differs from the commercial.

9. A non-transitory memory storage device to store instructions, the instructions comprising:
   one or more instructions that, when executed by a processor, cause the processor to:
      receive an enhanced media stream that includes:
         media content that includes a commercial,
         interactive content associated with the media content, and
         a trigger that indicates, to the processor, that the interactive content is available for the media content;
      present the media content for display on a video display device;
      receive a first instruction to fast forward, pause, or rewind the presented media content;
      fast forward, pause, or rewind the presented media content based on receiving the first instruction;
      determine whether the trigger is associated with a portion of the presented media content during the fast forwarding, the pausing, or the rewinding, present, based on determining that the trigger is associated with the portion of the presented media content during the fast forwarding, the pausing, or the rewinding, first information, associated with the interactive content, for display on the video display device, the presented first information being superimposed on the presented media content during the fast forwarding, the pausing, or the rewinding of the presented media content;

receive a second instruction requesting stopping of the fast forwarding, the pausing, or the rewinding of the presented media content;

stop, based on receiving the second instructions, the fast forwarding, the pausing, or the rewinding of the presented media content;

determine whether the stopping of the fast forwarding, the pausing, or the rewinding of the presented media content occurs while the commercial is being presented for display; and present, when the stopping the fast forwarding, the pausing, or the rewinding of the presented media content occurs while the commercial is being presented for display, second information for display on the video display device, the second information being different from the first information, and the presented second information being superimposed on the presented media content.

10. The non-transitory computer readable medium of claim 9, where:

the enhanced media stream includes a plurality of interactive content, and the instructions further include:

one or more instructions that, when executed by the processor, cause the processor to:

identify a product or a service associated with the commercial, and select, based on the product or the service, the interactive content from the plurality of interactive content.

11. The non-transitory computer readable medium of claim 9, where the trigger marks a location of the commercial within the enhanced media stream.

12. The non-transitory computer readable medium of claim 9, where:

the one or more instructions, to present the first information, further include:

at least one instruction to:

generate a first overlay that includes the first information and information regarding a status of the fast forwarding, the pausing, or the rewinding, and present the first overlay superimposed on the presented media content during the fast forwarding, the pausing, or the rewinding; and the one or more instructions, to present the second information, further include:

at least one instruction to:

generate a second overlay that includes the second information, the second overlay being different from the first overlay; and present the second overlay superimposed on the presented media content after stopping the fast forwarding, the pausing, or the rewinding.

13. A device, comprising:

a memory; and a processor to:

receive an enhanced media stream that includes media content and interactive content associated with the media content, the media content including a commercial, store the enhanced media stream in the memory, present the stored media content for display on a video display device, detect a first instruction to fast forward, pause, or rewind the presented media content, present, based on detecting the first instruction, first information, included in the interactive content, the presented first information being superimposed on the presented media content while fast forwarding, pausing, or rewinding the presented media content, detect, while presenting the first information, a second instruction requesting stopping of the fast forwarding, the pausing, or the rewinding of the presented media content, stop, based on receiving the second instruction, the fast forwarding, the pausing, or the rewinding of the presented media content, determine whether stopping of the fast forwarding, the pausing, or the rewinding of the presented media content occurs while the commercial is being presented for display; and present, when the stopping of the fast forwarding, the pausing, or the rewinding of the presented media content occurs while the commercial is being presented for display, second information associated with the interactive content, the second information being superimposed on the presented media content, and the second information being different from the first information.

14. The device of claim 13, where, when presenting the first information, the processor is further to:

modify a status bar, presenting information regarding a status of the presented media content, to include the first information associated with the interactive content, and present the modified status bar superimposed on the presented media content.

15. The device of claim 13, where:

the enhanced media stream includes a plurality of interactive content, and the processor is further to:

identify a product or a service associated with the commercial, and select, based on the product or the service, the interactive content from the plurality of interactive content.

16. The device of claim 13, where the enhanced media stream further includes a trigger that indicates that the interactive content is available for the media content; and where the processor, when presenting the first information, is further to:

detect the trigger in the presented media content, and present the first information further based on detecting the first information not being presented during the fast forwarding, the pausing, or the rewinding of the presented media content when the trigger is not detected.

17. The device of claim 16, where the processor is further to:
  parse the interactive content, based on detecting the trigger, to identify the first information and the second information, and
  store the first information and the second information in the memory.

18. The device of claim 16, where:
  the trigger marks a location of the commercial within the enhanced media stream; and
  when presenting the first information, the processor is further to:
    present the first information only during the fast forwarding, the pausing, or the rewinding of a portion of the presented media content associated with the commercial.

19. The device of claim 13, where the processor, when presenting the second information, is further to:
  generate an overlay that includes the second information, and
  present the overlay superimposed on the presented media content on the video display device after stopping the fast forwarding, the pausing, or the rewinding of the presented media content.

20. The device of claim 13, where the enhanced media stream includes first portions and second portions, the second portions including the media content,
  where the interactive content is included in the first portions and is not included in the second portions,
  where the processor, when presenting the first information, is further to:
    access, based on detecting the first instruction, the first portions of the enhanced media stream, and
    determine the first information based on accessing the first portions of the enhanced media stream, and
  where the processor when presenting the media content is further to access the second portions of the enhanced media stream.

* * * * *